UNITED STATES PATENT OFFICE.

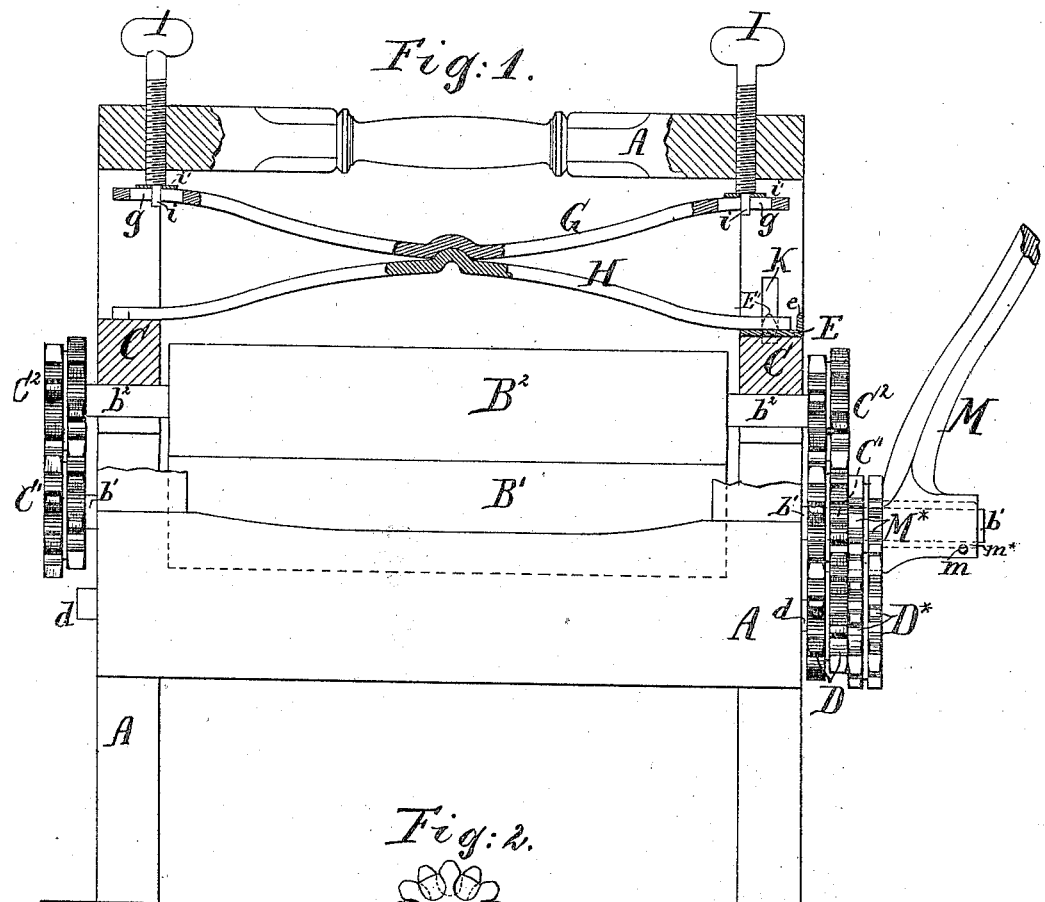

NAPOLEON B. PHELPS, OF NEW YORK, N. Y., ASSIGNOR TO THE METROPOLITAN WASHING-MACHINE COMPANY, OF MIDDLEFIELD, CONN.

IMPROVEMENT IN WRINGERS.

Specification forming part of Letters Patent No. 172,652, dated January 25, 1876; application filed December 22, 1875.

*To all whom it may concern:*

Be it known that I, NAPOLEON B. PHELPS, of New York city, in the State of New York, have invented certain Improvements relating to Clothes-Wringers, of which the following is a specification:

Many attempts have been made to introduce purchase-gears in wringers. I have devised an improved construction of the gearing and connected parts, by which motion is communicated to the rollers.

I give any desired increase of purchase to the hand with a given radius of the crank, while leaving the upper roller free to rise and sink with the action of the springs, to accommodate thick and thin masses of clothing, and with gearing which is highly efficient and durable.

The accompanying drawings form a part of this specification, and represent what I consider the best means of carrying out the invention.

A recess or mortise, extending part way through the upper spring to receive the end of the pressure-screws, would answer the purpose of a slot, and might be more cheaply made than the slot represented in the drawings.

Figure 1 is an elevation, partly in section, showing a face view of the whole. Fig. 2 is an end view of the gearing alone, and Fig. 3 is a perspective view of one of the metal parts which I employ over each of the boxes of the upper roller.

Similar letters of reference indicate like parts in all the figures.

A is the fixed frame-work. $B^1$ is the lower roller, and $B^2$ is the upper roller, composed of rubber, and mounted on shafts $b^1$ $b^2$, which extend beyond both ends of the framing, and receive fixed gear-wheels $C^1$ $C^2$, made "stepped," and with a connecting-web at the mid-length of each, as represented. The shaft $b^1$ is extended out beyond the wheel $C^1$, and adapted to form a bearing for loosely-mounted parts to revolve thereon.

Gearing into the gear-wheel $C^1$ is a similar wheel, D, mounted on a shaft, $d$, fixed on a bearing at the right distance for the proper connection of the cogs. Alongside the wheel D, and rigidly connected thereto, is a wheel, $D^*$, of larger diameter than wheel D, and with finer teeth. Mounted loosely on the extended end of the shaft $b^1$ is a smaller toothed wheel, $M^*$, gearing with the wheel $D^*$. Both the wheels $D^*$ and $M^*$ are also stepped—that is to say, although having smaller teeth than the wheels D and $C^1$, they are each correspondingly formed, having a continuous web around the mid-length, extending about to the pitch-line, and having the gear-teeth each side in such positions that each tooth on one side of the connecting-web stands opposite to a space between the teeth on the other side of the connecting-web. A crank, M, corresponding to the ordinary driving-crank of the wringer, (except in its hub or center, and the mechanism to which it is connected,) is keyed on a sleeve or extension, $m^*$, of the hub of the wheel $M^*$ by means of a key, $m$.

The gear-wheels $C^1$ and $C^2$ being firmly keyed on their respective shafts $b^1$ $b^2$, and the wheel $D^*$ being firmly keyed to the wheel D, either through the medium of a sleeve, as represented, or otherwise, the gear-wheel $M^*$, with its long bearing afforded by its sleeve $m^*$ and the attached crank M, may be held against slipping off the extended end of the shaft $b^1$ by means simply of its engagement with the wheel $D^*$, or by a pin or nut in the usual way. The stepped gear-wheel $M^*$ locks into the wheel $D^*$, so as not only to compel the turning together, but also to hold each other in proper position longitudinally with only a little play.

The springs G H are made from flat pieces of steel, formed by dies while in a heated condition, in the shapes shown. The upper one has a narrow slot near each end, as indicated by $g$ $g$.

C C are the boxes, which bear on the shafts $b^2$, and receive the downward pressure of the spring H. To bore any hole in this box would tend to induce splitting. I avoid this, and at the same time provide efficient means for holding the springs endwise, by the introduction of metallic pieces E, each having a lip, $e$, at the outer edge, to prevent the springs from working out of place.

The metal pieces E are formed with wings E' of suitable vertical depth, which, like the corresponding wings on the boxes C C, are guided up and down by grooves K K in the framing A, which extend up only as far as the pieces E E' e are to be allowed to rise.

These wings or projections, being extended above the level of the upper surface of the metal plate, present a long and smooth bearing-surface, and serve to prevent the side play of the springs against the wood post, and may also serve as a stop by coming against the top of the groove K K in the wood, to prevent any further strain being exerted on the steel springs to endanger their breaking.

I I are thumb-screws similar to those long and favorably known on wringing-machines, except that their lower ends are continued of smaller diameter below the plane of bearing on the spring G, as indicated by $i$. The extension $i$, standing in the slot $g$, forms a means of holding the upper spring G against displacement either sidewise or endwise.

I introduce washers $i'$ to afford a better bearing for the screw upon the metal of the spring adjacent to the slot $g$, and I cut the thread only to such a height as will allow the proper pressure, and no more, to be applied to the springs.

Some of the advantages due to certain features of the invention may be separately enumerated as follows: First, by reason of the sleeve $m^*$ and the key $m$, I am able to form the wheel M* with step-gear by the ordinary process of molding, and to join the crank M permanently and rigidly thereto with little expense for material or labor, and preserve a continuous smooth bearing on the shaft to take the severe wear. Second, by reason of the fact that the wheel M* and crank M are mounted upon the extended shaft $b^1$, and geared, as shown, to the wheels D* D on the separate shaft or stud $d$, I am able to drive the gear-wheel $C^1$ of the lower roll in the right direction by the natural forward movement of the crank, and to leave the upper roll B² free to rise and sink independently. Third, by reason of the fact that the wheels M* and D* are step-geared, and that the crank M is fixed upon a sleeve, $m^*$, extending from the gear-wheel M*, I am able to retain the crank and its attached gear-wheel M* without other fastenings, and to utilize the whole of the overhanging end of the shaft $b^1$ as bearing therefor, and also to mold the wheel in the stepped form represented without a necessity for coring. Fourth, by reason of the fact that the spring G is of metal, slotted as shown, and receiving the pressure-screws I I, my rollers are pressed together with reliable springs of permanent elasticity, which are effectively held against displacement without danger of cutting and destroying the framing. Fifth, by reason of the casting E, wings E', and projection or lip $e$, serving as shown relatively to the boxes C C and lower spring H and the short grooves K K, I am able to guide the springs by the boxes without impairing the durability of the boxes or of the framing, and to form an efficient stop to prevent the cogs from going out of gear, and to prevent too great a strain being brought upon the springs in any case.

I claim as my improvement in clothes-wringers—

1. The sleeve $m^*$ on a loose wheel, M*, in combination with the crank M and a suitable key, $m$, and adapted to serve as herein specified.

2. In combination with the elastic rolls of a clothes-wringing machine, the purchase-gear wheel M*, firmly attached to the operating-crank, and revolving on the shaft $b^1$ of the lower roll, the gear-wheels D* and D, mounted on the shaft or stud $d$, and an upper roll capable of independently rising and sinking, and operating with the gear $C^1$ to turn the shaft $b^1$ of the lower roll, substantially as described.

3. The slotted spring G $g$ $g$, in combination with the adjusting-screws I I, and with the wringer-rollers B¹ B², as and for the purposes specified.

4. The metal pieces E, having guide-wings E' and lip $e$, in combination with a spring, H, and with the boxes C C, grooves K K, and shafts $b^1$ $b^2$, and their connections, as herein specified.

In testimony whereof I have hereunto set my hand.

N. B. PHELPS.

Witnesses:
H. E. B. DENNISON,
J. E. DOWD.